Sept. 26, 1950      G. A. HOLT ET AL      2,523,699
PISTON
Filed Aug. 21, 1947      4 Sheets-Sheet 1
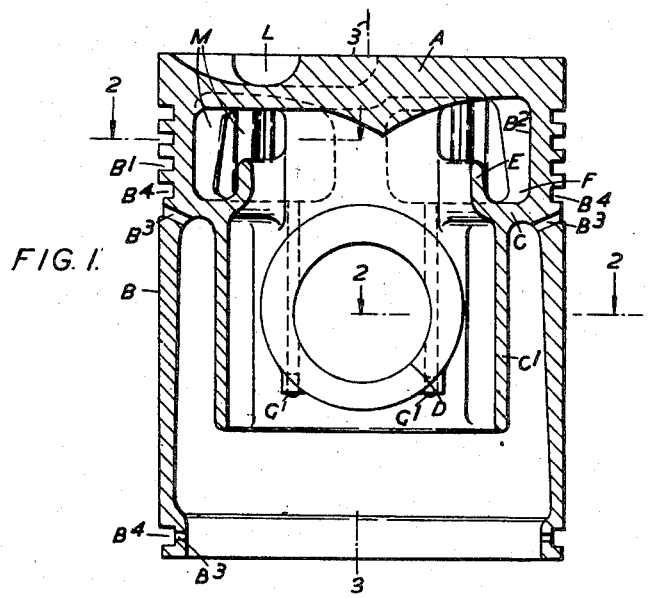
FIG. 1.
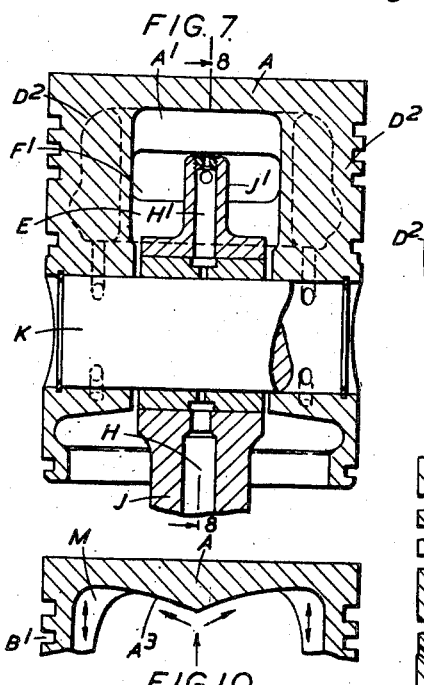
FIG. 7.
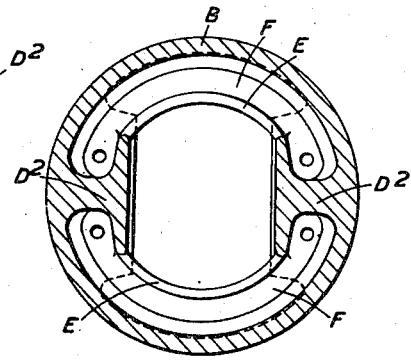
FIG. 9.
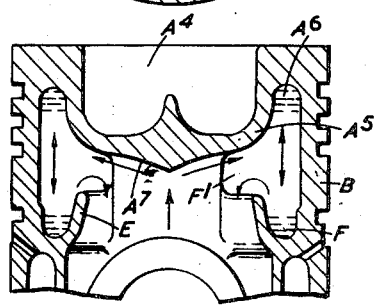
FIG. 10.
FIG. 11.
Inventor
G. A. Holt & R. Watts
By
Watson, Cole, Grindle & Watson
Attorney Sept. 26, 1950  G. A. HOLT ET AL  2,523,699
PISTON
Filed Aug. 21, 1947  4 Sheets-Sheet 2
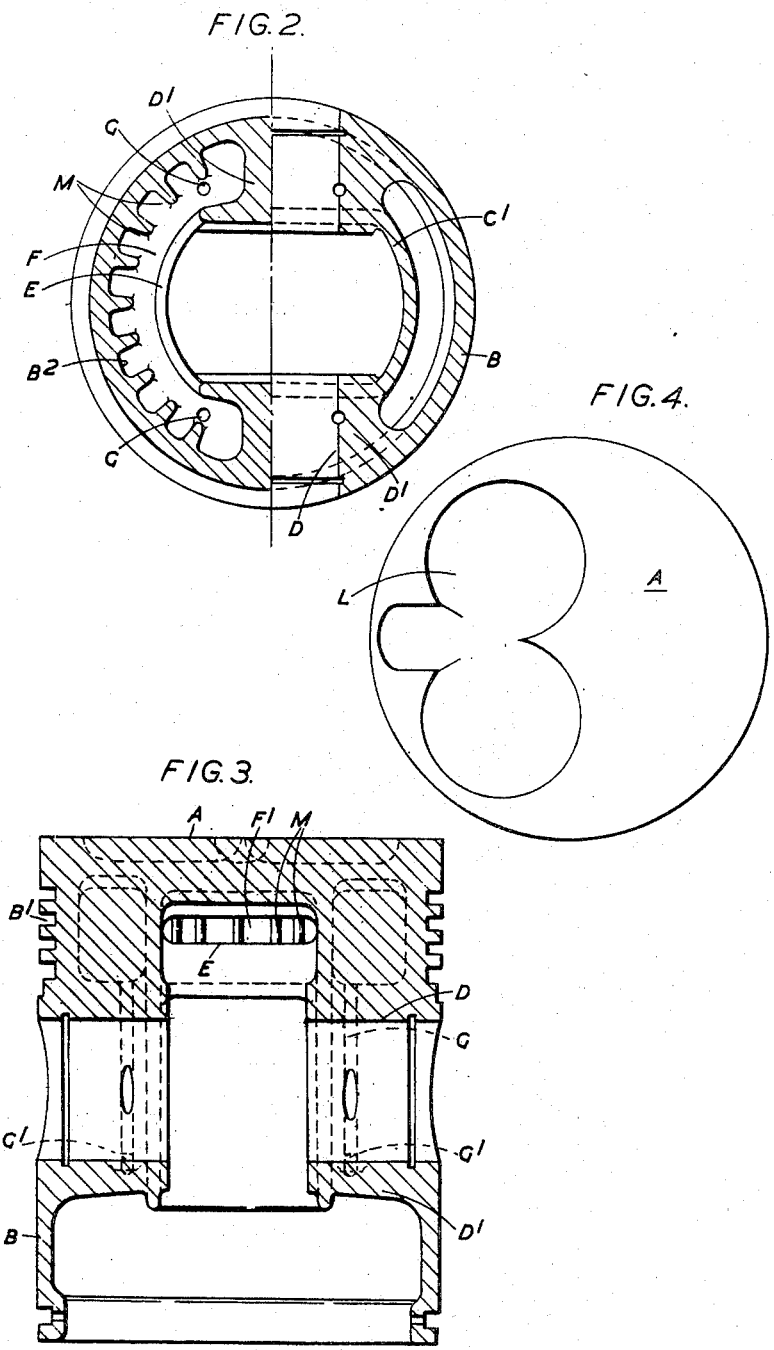

Sept. 26, 1950 G. A. HOLT ET AL 2,523,699
PISTON
Filed Aug. 21, 1947 4 Sheets-Sheet 3

Inventor
G. A. Holt
R. Watts
By
Watson, Cole, Grindle & Watson
Attorney

Sept. 26, 1950     G. A. HOLT ET AL     2,523,699
PISTON
Filed Aug. 21, 1947     4 Sheets-Sheet 4
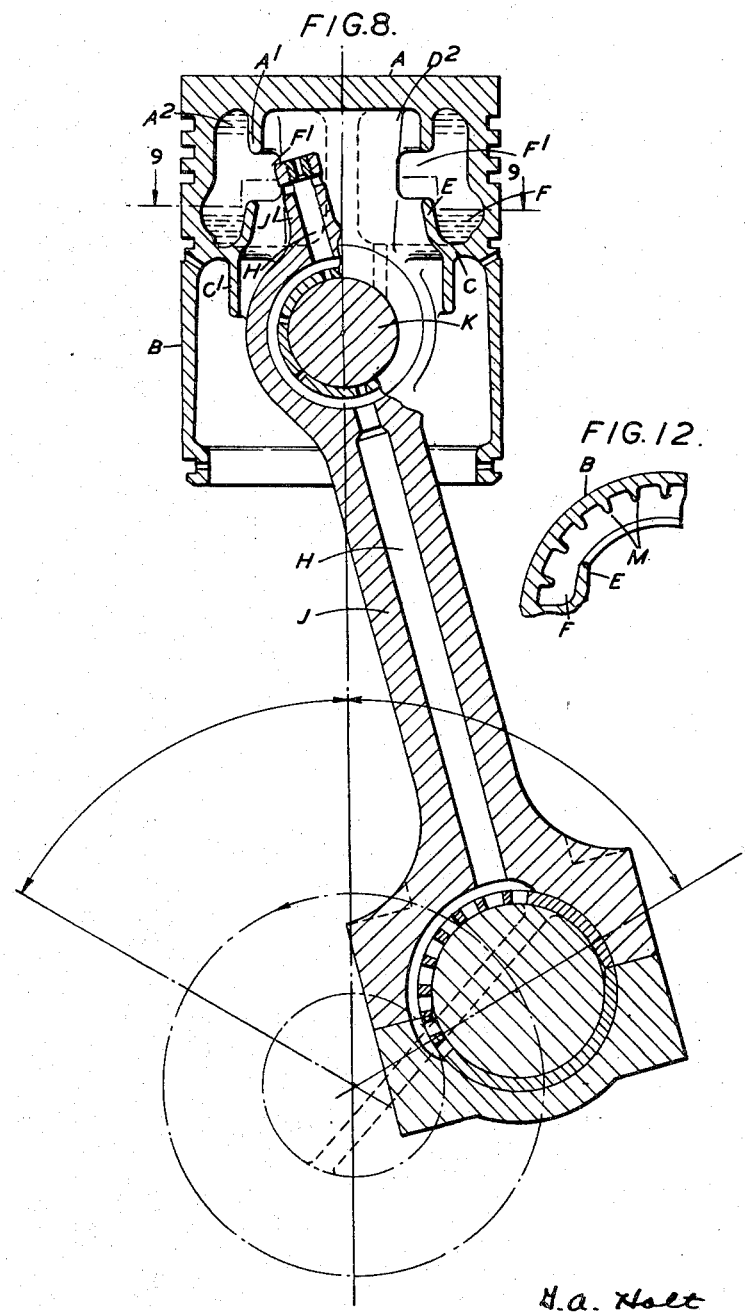
Inventor
G. a. Holt
+ R. Watts
By
Watson, Cole, Grindle & Watson
Attorney Patented Sept. 26, 1950

2,523,699

UNITED STATES PATENT OFFICE 2,523,699

PISTON

George Allen Holt and Richard Watts, Shoreham-by-Sea, England, assignors to Harry Ralph Ricardo, London, England Application August 21, 1947, Serial No. 769,823
In Great Britain August 21, 1946

11 Claims. (Cl. 123—41.38)

This invention relates to pistons and more particularly to the cooling of trunk pistons by lubricating oil delivered into the interior of the piston from the end of the connecting rod to which it has been conveyed through suitable passageways the delivery being preferably timed by the arrangement and disposition of passages in the big-end bearing and crank pin.

In a known method of cooling the pistons of internal combustion engines oil conveyed up the connecting rod from the big-end is delivered in the form of one or more jets against the underside of the piston crown and in some cases also against that part of the wall or skirt of the piston which lies behind the rings. The oil is then drained from the piston by inertia forces.

The object of the present invention is to provide a piston in which the oil supplied thereto will be used to better advantage in cooling those parts of the piston where the rings are carried and which lie adjacent to the piston crown.

According to this invention the improved trunk piston has formed within it a substantially annular chamber which is bounded outwardly by the wall or skirt of the piston, in one axial direction by the crown of the piston, and in the opposite direction by an annular flange-like formation which projects first inwards towards the piston axis and then towards the crown forming a lip and leaving between the edge of this lip and the crown or a part thereon an annular opening leading radially into the chamber and through which can pass into the chamber oil delivered in jets from the adjacent end of the connecting rod, the oil in the chamber being caused to move relatively to the parts of the piston forming the wall of the chamber as the piston reciprocates and more especially to flow over the outer wall of the chamber behind the rings on which the oil will have a cooling effect before it escapes through the said annular opening. The flange-like part within the skirt of the piston forms a recess or trough with its hollow facing the crown of the piston and constitutes a part of the annular chamber. A substantial quantity of the oil delivered in jets from the end of the connecting rod is retained in the trough so that oil is substantially continuously fed into the trough by these jets, is shaken between the trough and the crown as the piston reciprocates and eventually escapes through the annular opening between the lip and the piston crown. The annular chamber and the trough therein may be constituted by two substantially similar segmental parts which are separated at their adjacent ends by the gudgeon pin bosses.

The whole of the annular formation and the trough therein may be integral with the crown and skirt of the piston. The inwardly directed flange-like part may be provided on the side thereof remote from the crown with a substantially cylindrical skirt-like projection which lies spaced inwards from the skirt of the piston and around the end of the connecting rod. In some cases the annular chamber may be constituted by an inwardly directed flange having attached to its edge a tubular member which then projects from the flange towards the piston crown and forms the side of the trough. The tubular member may also extend from the flange in the opposite direction towards the connecting rod. The underside of the crown may be variously shaped. For example it may be provided with an annular and conveniently cylindrical projection which extends towards the lip of the flange or trough, the opening into the annular chamber then being between the opposed edges of this projection from the crown and the lip formation. Again the crown of the piston may be cupped inwardly forming in the inner side of the crown an annular recess or trough which lies in and forms part of the annular chamber and is opposite to the annular formation or trough.

The accompanying drawings illustrate by way of example alternative constructions that may be employed in carrying the invention into practice.

Figure 1 is a longitudinal sectional elevation of one construction of piston embodying the present invention;

Figure 2 is a transverse section on the broken line 2—2 in Figure 1 looking in the direction of the arrows;

Figure 3 is a longitudinal section on the line 3—3 in Figure 1, that is in the plane containing the axis of the piston and the axis of the gudgeon pin;

Figure 4 is a plan showing the face of the piston which is illustrated in Figure 1;

Figure 7 is a longitudinal sectional elevation of yet another construction of piston embodying the invention;

Figure 8 is a section on the line 8—8 in Figure 7, that is in the plane containing the axis of the piston and normal to the axis of the gudgeon pin;

Figure 9 is a transverse section on the line 9—9 in Figure 8 looking in the direction of the arrows;

Figure 10 is a part longitudinal sectional elevation showing a modification of the underside of the crown of the piston;

Figure 11 is a similar view showing another modification in the formation of the head or crown of the piston, and Figure 12 is a part transverse section showing the cooling ribs or fins as in the construction shown in Figure 10.

Figure 5:
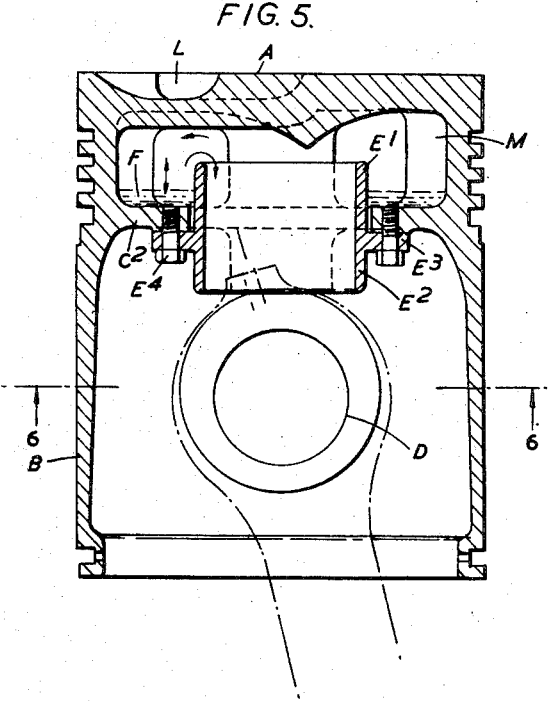
Figure 5 is a longitudinal sectional elevation of a modified construction of piston.

Referring to the construction shown in Figures 1–4, the piston comprises a head or crown A and a skirt B and within the latter is an inwardly directed flange-like member C projecting towards the piston axis from the skirt, this flange-like member being situated near the gudgeon pin bearing D and between that and the crown of the piston. The position of the flange member C is such that the part of the wall of the skirt B in which are the grooves $B^1$ for the rings lies between the flange C and the crown of the piston. At the inner edge of the flange C is an up-turned lip E directed towards the crown A and forming opposite to the underside of the crown and with the wall B, a recess or trough F which may be continuous as a completely annular trough or may be divided into two segmental parts, one of which is shown in the left-hand portion of the section in Figure 2. These segmental parts lie respectively on each side of, and extend in the circumferential direction between the gudgeon pin bosses $D^1$. The space between the under surface of the crown A of the piston and the flange C and within the lip E constitutes a substantially annular chamber on the inner side of that part of the wall or skirt B which on its outer surface has the grooves $B^1$ for the usual rings, the opening into this trough chamber F being between the under surface of the crown and the edge of the lip E. Through this opening will pass oil delivered in jets from the end of the connecting rod and since this oil will be trapped in the trough chamber F so that it cannot readily escape therefrom otherwise than over the lip E or by way of one or more drain passages G, the oil will be shaken to and fro between the piston crown and the flange C being in this way caused to flow at least in some part over the inner surface $B^2$ of the skirt B behind the grooves $B^1$. The oil that accumulates in the trough eventually escapes through the annular opening between the lip E and the piston crown at a rate equal to the supply from the jets.

The lip E may be substantially cylindrical over at least the main part of its length in the axial direction and the length of the lip in the axial direction and thus the depth of the trough F may vary.

Some of the oil which is trapped in the trough chamber F may flow away by the drain passages G leading from the bottom of the trough and to the gudgeon pin bosses D and closed as by plugs G at their lower ends, the inertia forces acting on the oil in the trough chamber tending to force some of the oil to flow to the gudgeon pin bearing D. The bulk of the oil however, will ultimately find its way out of the trough F over the lip E and so flow down towards the crank case. The oil will remain in the trough and chamber long enough to pick up the maximum heat from the wall $B^2$ and without obtaining too high a temperature. In order to prevent oil which escapes over the lip E from flooding the oil drain passages $B^3$ from the upper and lower scraper rings in the grooves $B^4$, the flange C may be provided with a substantially cylindrical skirt-like part $C^1$ directed oppositely to the lip E and spaced inwardly from the skirt B and between it and the end of the connecting rod. This skirt-like part $C^1$ which is dependent from the flange C will assist the oil going from the trough chamber F over the lip E to flow down the outside of the connecting rod to the crank case.

Figure 6:
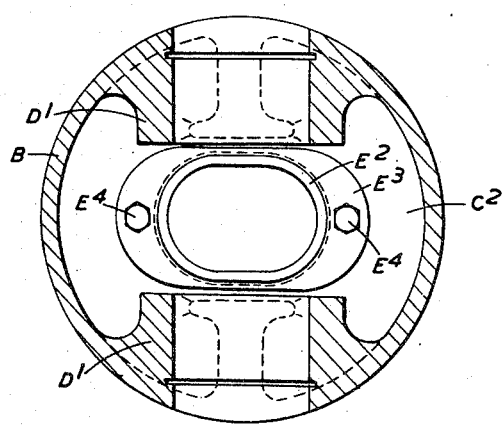
Figure 6 is a section on the line 6—6 in Figure 5 looking in the direction of the arrows.

The lip E may be formed integral with the flange C which itself is integral with the wall or skirt E of the piston as in the construction shown in Figure 1. In some cases however, the lip may be constituted by a separately constructed piece which is suitably connected to the inwardly directed flange. Such a construction is shown in Figures 5 and 6, where for example, the flange $C^2$ has a plain edge and attached thereto, is a tubular member comprising what may be referred to as an inner part $E^1$, an outer part $E^2$, and an external rib or flange $E^3$. This tubular member is attached to the flange $C^2$ by studs $E^4$ passing through the annular rib $E^3$. The inner end portion $E^1$ functions as the lip at the inner edge of the flange $C^2$ while the outer part $E^2$ functions in some degree as the skirt $C^1$ in the construction shown in Figure 1. The tubular member $E^1E^2$ is conveniently oval in cross-section as can be seen in Figure 6, but in some cases, it may be circular and when so formed, it may be connected to the flange $C^2$ by screw-threading the exterior of the tubular member and the edge of the flange $C^2$. The tubular member may then have an external rib somewhat similar to the rib $E^3$ which will determine its position in the axial direction when screwed into the flange $C^2$. The length of the tubular member $E^1E^2$ may vary in accordance with other details in the construction.

Referring to the construction shown in Figures 7, 8 and 9, in this case the crown A of the piston has formed on its under side an annular projection $A^1$ which extends for a suitable distance in the axial direction and towards the edge of the lip E which in this case, as in the construction shown in Figure 1, is formed integral with the flange C. The lip E is here shown for example, as being somewhat conical as distinct from its cylindrical form in Figure 1. The projection $A^1$ forms an inverted annular trough or recess $A^2$ in the marginal part of the underside of the crown and behind one or more of the rings which lie in the grooves $B^1$, this trough $A^2$ facing the trough F constituted by the flange C and lip E. The whole annular chamber into which the oil is thrown and wherein it is shaken, is thus constituted by the opposed troughs F and $A^2$ with the entry opening $F^1$ into this chamber. As in the construction shown in Figures 1, 2 and 3, the trough chamber is actually divided into two similar portions by the parts $D^2$ which connect the gudgeon pin bosses $D^1$ with the crown of the piston.

Oil delivered through the passage H in the connecting rod J passes the gudgeon pin K and through the passage $H^1$ in the projection $J^1$ will pass through the opening $F^1$ into the trough chamber and be there shaken between the opposed troughs F and $A^2$ and in this way, will be at least mainly kept in this chamber and caused to move over the inner surface of the skirt B behind the grooves $B^1$ and thereby have the desired cooling effect.

In the construction shown in Figure 8, the inner surface of the crown A of the piston within the flange $A^1$ is substantially flat. As distinct from this formation and in place of the projection $A^1$, the inner face of the crown may be formed with a flatly conical projection $A^3$ as shown in Figure 10, this formation tending to cause the oil to be thrown laterally from the centre of the crown in the manner indicated by the arrows and thus into the trough chamber F.

Alternately, and as shown in Figure 11, the outer face of the piston crown may be recessed as at $A^4$ and as in certain known forms of piston, the whole centre portion of the crown then having a somewhat cup-shape and projecting inwardly. This formation provides within the piston a part $A^5$ which will form a trough $A^6$ similar to the trough $A^2$ in the construction shown in Figure 8. With the inner face of the indented crown formed conical, as at $A^7$ in the same way as the construction shown in Figure 10, the oil from the connecting rod will tend to flow into the chamber constituted by the opposed troughs F and $A^6$ through the gap $F^1$.

The lip E, as also a projection such as $A^1$ from the crown may both merge into the parts $D^2$ which connect the gudgeon pin bosses $D^1$ with the crown.

Where the under surface of the crown A is formed with a conical or like curvature extending from a centrally positioned cusp as shown in Figure 10 or Figure 11, this cusp may be located either centrally or at one side of the piston axis. This formation will then tend to direct more oil into one of the two parts of the trough chamber F than into the opposite part. With such an arrangement, additional cooling will be provided for the parts in contact with which most of the oil is caused to flow, and this arrangement may be particularly suitable in a piston of known form for use in an internal combustion engine, this piston having a laterally placed recess in the face of the crown into which fuel is directed. Such a recess is indicated at L in Figure 4.

In some cases, there may be provided in the trough chamber ribs M which project inwardly from the wall B of the piston skirt, these ribs extending from the crown A to the trough F behind the lip E. These ribs will increase the heat dissipating area in contact with the oil as it is shaken to and fro in the trough chamber and the ribs will also serve to stiffen the piston. These ribs may be seen in Figures 1, 2, 5 and 10 and are shown in the separate detail section, Figure 12. The ribs do not extend completely across the chamber in the radial direction, but only project a short distance from the wall B of the piston and are arranged so that they do not interfere with the circumferential continuity of the trough F.

While the trough chamber may be continuous all round within the piston, in most cases and as mentioned and shown for example, in Figures 2 and 9, the trough F is divided into two parts each of which extends circumferentially between the gudgeon pin bosses $D^1$.

In a piston construction as described above, the best use is made of a given quantity of oil supplied into the piston through the connecting rod. Any given portion of this oil projected by the oil jets into the trough chamber F within the piston will be retained there long enough to take up considerably more heat than can be picked up by a corresponding quantity of oil which in constructions of piston as commonly in use, is merely projected as a jet against the inside of a piston crown and then allowed to flow away.

The oil in the annular chamber and trough has been referred to as being shaken to and fro between the bottom of the trough and the crown of the piston. Actually as the piston reciprocates the inertia forces cause the oil to be moved alternately from the bottom of the trough to the piston crown and back again and during this movement the oil will flow at considerable speed along the surface of the wall of the annular chamber and especially that part of the wall which lies behind the rings and under the crown thereby promoting the cooling of these parts.

What we claim as our invention and desire to secure by Letters Patent is:

1. A trunk piston comprising in combination a crown and skirt with grooves in a part of the latter adjacent to the crown for the reception of rings, a flange-like formation projecting inwardly towards the piston axis from the skirt, a lip at the inner edge of this flange-like formation, said lip being directed towards the crown of the piston and lying around a central opening, a connecting rod pivoted on a gudgeon pin journalled in bosses fixed interiorly in said piston, the upper portion of said connecting rod partially occupying said central opening, the said lip and flange-like formation together forming a trough which extends around inside the skirt and constitutes a part of a chamber bounded externally by the inner wall of the skirt behind the said grooves for the rings, there being an annular opening provided into this chamber between the said lip and the crown of the piston through which opening oil can pass into the chamber delivered in jets from the adjacent end of the said connecting rod, the oil in the chamber being caused to move relatively to the parts of the piston forming the walls of the chamber as the piston reciprocates and to flow over the outer wall of the chamber behind the said rings whereby the oil will have a cooling effect before it flows out of the piston through the said annular opening and said central opening.

2. A trunk piston comprising the parts as set forth in claim 1, in which the said annular chamber and trough therein are constituted by two substantially similar segmental parts which are separated at their adjacent ends by the gudgeon pin bosses.

3. A trunk piston comprising the parts as set out in claim 1 and wherein the whole of the said annular formation within the skirt and the trough therein are integral with the crown and skirt of the piston.

4. A trunk piston comprising the parts as set out in claim 1 in which the said inwardly directed annular flange-like formation is provided on the side thereof remote from the crown with a substantially cylindrical skirt-line projection which is spaced apart inwards from the skirt of the piston and lies around the end of the connecting rod.

5. A trunk piston as claimed in claim 4 in which on the underside of the piston crown is provided an annular projection extending towards the adjacent edge of the lip so that the opening into the annular chamber is formed between the opposed edges of the said projection from the crown and the adjacent edge of the lip.

6. A trunk piston having the parts as set out in claim 1 in which the said annular chamber and trough therein, are constituted by an inwardly directed flange formed integral with the skirt of the piston and having attached to its edge a tubular member which projects from the flange towards the piston crown and forms the side of the trough.

7. A trunk piston as claimed in claim 6 in which on the underside of the piston crown there is provided an annular projection extending towards the edge of the tubular member so that the opening into the annular chamber is formed between the opposed edges of the said projection from the crown and the adjacent edge of the tubular member.

8. A trunk piston having the parts as set out in claim 1 in which the said annular chamber and trough therein are constituted by an inwardly directed flange formed integral with the skirt of the piston and having attached to its inner edge a tubular member which projects from the flange both towards the piston crown to form the side of the trough and away from the piston crown towards the connecting rod.

9. A trunk piston as claimed in claim 8 in which on the underside of the piston crown is provided an annular projection extending towards the adjacent edge of the tubular member so that the opening into the annular chamber is formed between the edges of the said projection from the crown of the piston and the adjacent edge of the tubular member.

10. A trunk piston having the parts as set out in claim 1 in which on the underside of the piston crown there is provided an annular projection extending towards the lip on the inner edge of the flange-like formation, the opening into the annular chamber being between the opposed edges of the said projection on the crown and the said lip.

11. A trunk piston as claimed in claim 1 in which the centre part of the piston crown is formed as a cup or recess providing within the piston an annular recess constituting the part of the annular chamber adjacent to the piston crown.

GEORGE ALLEN HOLT.
RICHARD WATTS.

REFERENCES CITED

The following references are of record in the file of this patent:

UNITED STATES PATENTS

| Number | Name | Date |
|---|---|---|
| 878,783 | Downie | Feb. 11, 1908 |
| 1,684,629 | Keller | Sept. 18, 1928 |
| 1,743,023 | Carter | Jan. 7, 1930 |
| 1,779,555 | Minnick | Oct. 28, 1930 |
| 2,241,629 | Brill | May 13, 1941 |

FOREIGN PATENTS

| Number | Country | Date |
|---|---|---|
| 449,069 | Germany | of 1927 |